Nov. 29, 1932.  W. M. SMITH ET AL  1,889,114
OIL WELL SURVEYING INSTRUMENT
Filed July 19, 1930   4 Sheets-Sheet 4
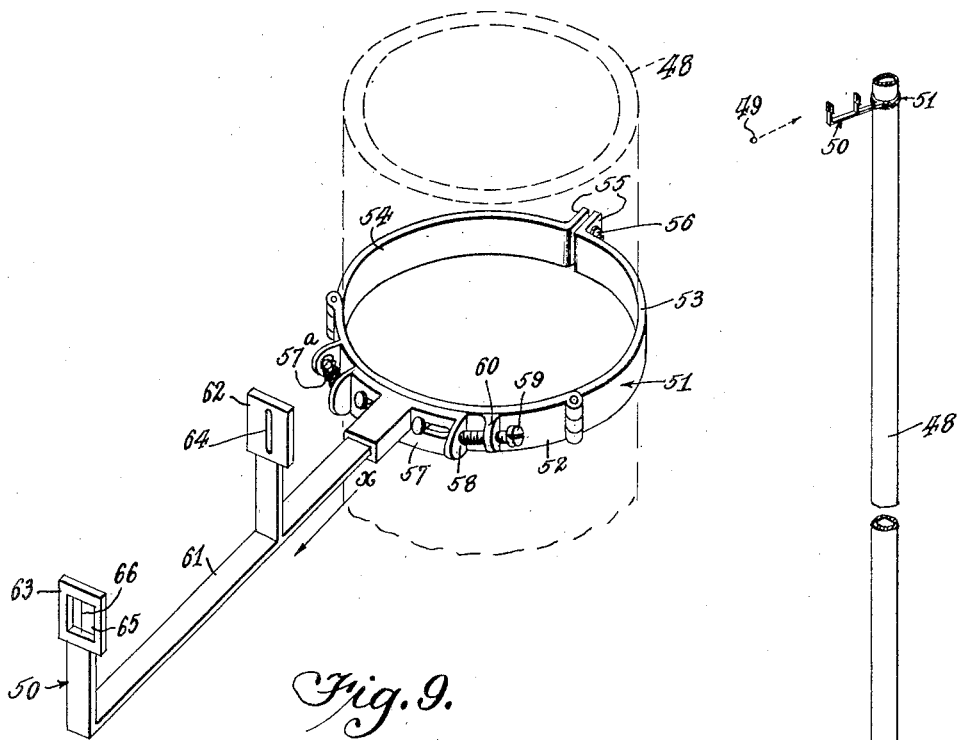
Fig. 9.
Fig. 8.
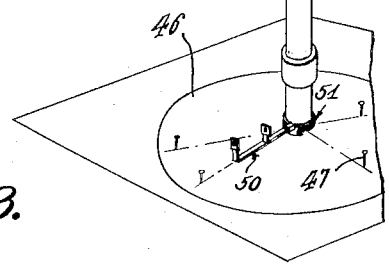

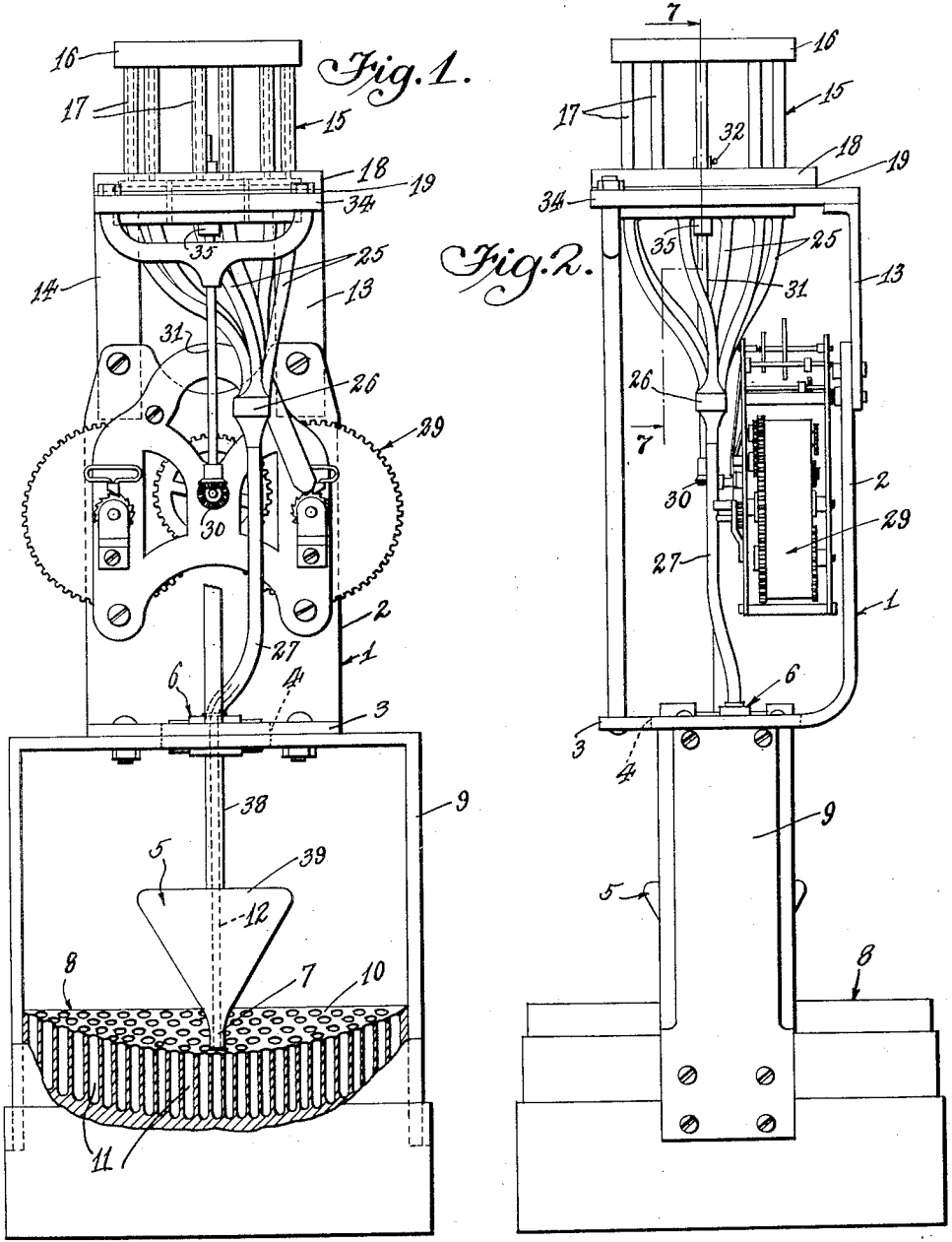

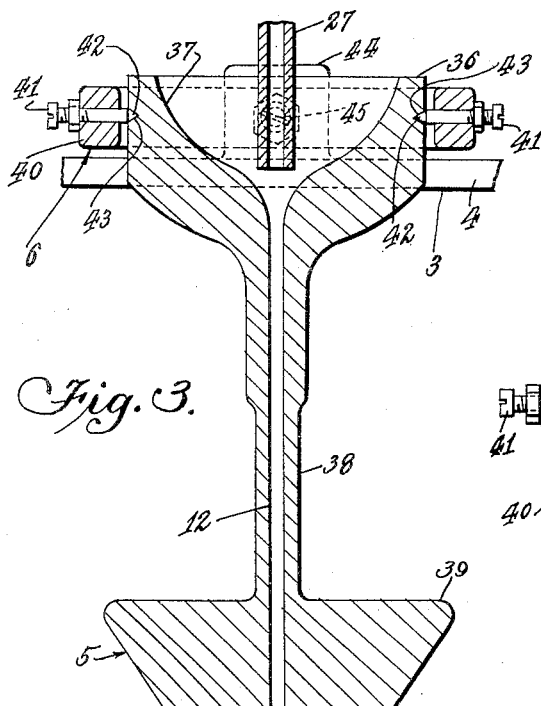
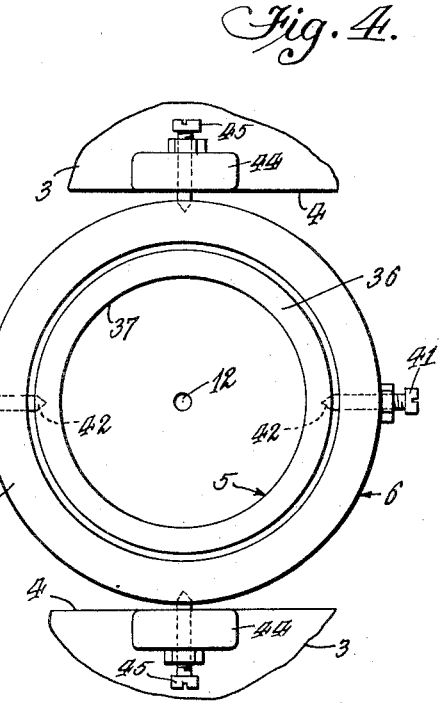
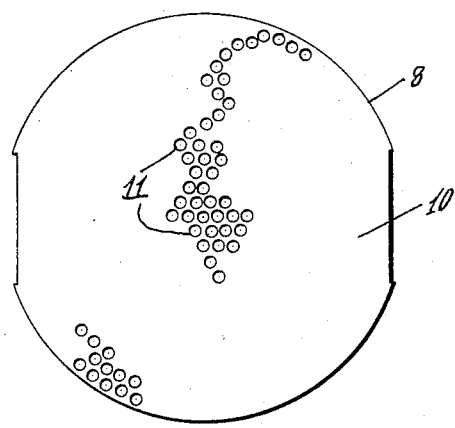

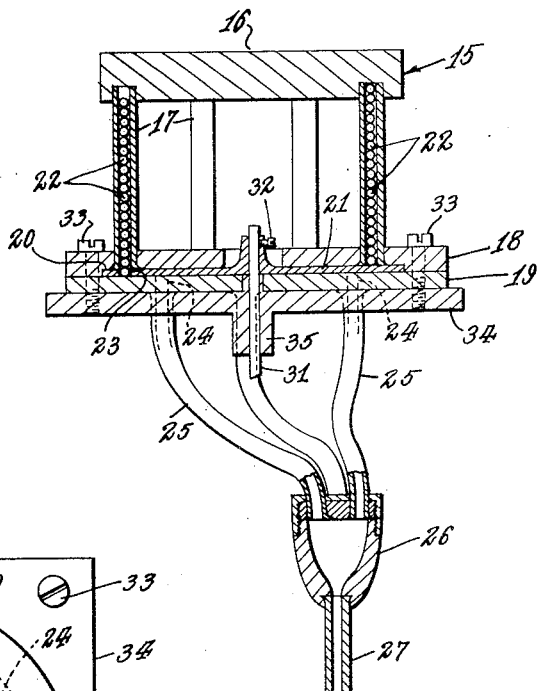
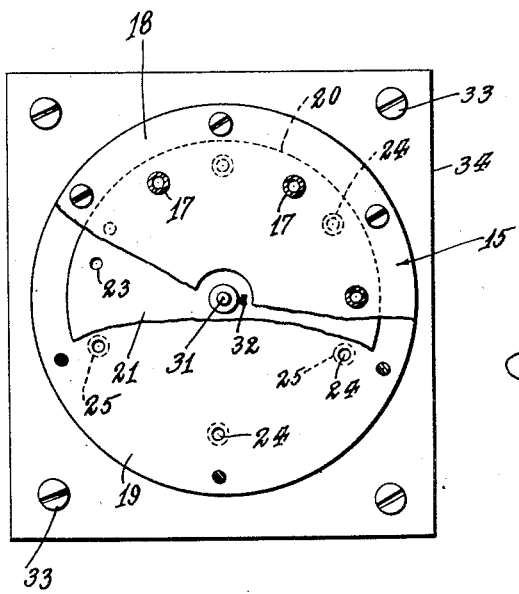

Patented Nov. 29, 1932

1,889,114

UNITED STATES PATENT OFFICE

WAYNE M. SMITH AND KENNETH W. HALEY, OF SANTA BARBARA, CALIFORNIA

OIL WELL SURVEYING INSTRUMENT

Application filed July 19, 1930. Serial No. 469,217.

Our invention relates to instruments for measuring angular deflection and has particular reference to instruments for measuring the angular deflection of bores, such as wells or the like, swung into the earth.

During the process of boring wells such as oil wells, the penetration of the boring tools through various strata causes deflection of the boring tool so that the bore, instead of extending vertically, as it should, becomes deflected and the bottom of the bore is sometimes disposed at a considerable distance from the true vertical line from the top of the well. It is essential that the location of the bottom of the well be determined and while various methods have been proposed for measuring the deflection of the bore from the vertical, the previous devices have been inaccurate and unwieldy to handle, making the survey of a well a laborious operation without assurance that the final result will be correct.

It is, therefore, an object of our invention to provide a device for measuring the deflection of a well bore which will determine not only the angular deflection of the bore from the true vertical, but will also measure the direction of the deflection.

Another object of our invention is to provide an instrument for surveying the bores of wells in which the direction and magnitude of the deflection of the bore from the true vertical may be readily measured and registered so that the contour of the well may be calculated at leisure.

Another object of our invention is to provide an instrument for measuring the direction and magnitude of the deflection of a bore from the true vertical in which the measurements may be taken at predetermined time intervals, allowing the time between the intervals to be utilized for placing the instrument in a new position in the bore.

Another object of our invention is to provide a device for readily determining the horizontal rotation of an element which has been lowered into the bore.

Our invention will be described with reference to the accompanying drawings, wherein Figure 1 is a front elevation of our surveying instrument shown partly in section.

Figure 2 is a side elevational view of our surveying instrument.

Figure 3 is a detail view of the plumb-bob construction utilized in our surveying instrument.

Figure 4 is a detail plan view showing the manner of mounting the plumb-bob in our instrument.

Figure 5 is a detail view of the registering base of our instrument.

Figure 6 is a detail view partly in section of the timed registering device utilized with our invention.

Figure 7 is a detail sectional view taken along line 7—7 of Figure 2.

Figure 8 is a perspective view of the horizontal angular determining device used with our invention.

Figure 9 is a detail view showing the citing instrument employed in practicing our invention.

The direction and configuration of a well bore may be measured by lowering an instrument into the bore which will register the magnitude of the deflection of the bore from the true vertical and which will also register the direction of such deflection. Such an instrument attached to a tool string and lowered into the bore may be positioned at various depths of the bore so that the deflection at any particular point may be registered. Hence, a device which can be attached to a tool string and lowered to a desired position with the instrument so arranged that while the instrument is stationary at the desired position the angular deflection of the instrument may be registered and may be compared with the horizontal rotation through which the tool string has moved in reaching this desired position. Thus, if an instrument attached to the tool string is lowered, say 20 feet, into the bore, a reading may be obtained showing the direction of the deflection and the magnitude of the deflection of the bore at that point. The instrument may then be lowered to a further position such as 40 feet and a second reading obtained, these readings being plotted to give a complete picture of the contour of the bore.

We have devised an instrument for use in measuring the contour of well bores comprising a frame 1 which may be formed in any suitable manner as by means of an angular plate 2 having a flange 3 struck therefrom with an opening 4 in the center of the flange 3 to which may be attached a plumb-bob 5, the attachment being of the form known as a universal mounting 6 allowing the plumb-bob to swing about the mounting in all directions so that plumb-bob 5 may at all times assume a true vertical position. The plumb-bob will, therefore, assume a position at which the lower end 7 thereof assumes a definite position with respect to a base 8 which may be secured to the frame in any suitable manner as by a yoke 9. The base member which we propose to use consists of a solid block 8, the upper face 10 of which presents a concave surface which parallels the motion of the lower end 7 of the plumb-bob 5. In this base 8 we provide a plurality of perforations or openings 11 bored thereinto, substantially the entire concave surface being penetrated by the bores. These bores may extend directly downward from the surface 10 or may be disposed at various angles, as desired. Each of the bores constitutes an opening into which may be projected a registering device such as a small pellet or ball which may be dropped to the surface 10 through an opening or bore 12 passing through the vertical axis of the plumb-bob and terminating at the lower end 7 of the plumb-bob 5. Thus, if the instrument is disposed at an angle, say of 15°, the plumb-bob would position its opening or bore 12 over that one of the bores 11 in the base which represents a deflection of 15° from the true vertical.

Since the perforations or openings to the bores 11 are arranged in all directions from the center of the surface 10, it is immaterial what the angular horizontal rotation of the instrument may be and there will always be one of the openings in alinement with the lower end of the bore 12 of the plumb-bob 5. By measuring the angle through which the instrument has rotated, as will be hereinafter described, not only the magnitude of the angular deflection may be measured, but also the direction of the deflection may be recorded.

Secured to the frame 1 in any suitable manner, as by a pair of standards 13 and 14, I have illustrated a housing 15 for containing the pellets which are to be dropped into the bores 11. This housing 15 comprises a suitable supporting plate 16 equally spaced around which are a plurality of dependent tubes 17. The instrument described is represented as being provided with six of these depending tubes 17, though it is to be understood that any suitable number may be provided. The tubes terminate in a base plate 18 to which is attached a second plate 19, there being a countersunk opening 20 in the plate 18 to permit of the rotation therein of a disc 21. The disc 21 is provided with a single opening of such size as to allow one of the pellets 22 to pass into the disc 21 as the opening 23 is alined with any one of the tubes 17.

The plate 19 is perforated with a series of openings extending vertically therethrough, there being a number of openings 24 equal to the number of tubes 17, the openings 24 being annularly alined with the tubes 17 but angularly disposed with reference thereto so that upon rotation of the disc 21 to pick up one of the pellets from one of the tubes 17, the disc must rotate through a further angle before the opening 23 in the disc 21 is aligned with the associated opening 24 in the plate 19. Thus one pellet at a time is selected from one of the tubes 17 and is passed to its associated opening 24 in the plate 19, and then the disc 23 selects a pellet from the next tube in the direction of its rotation.

All of the openings 24 in the plate 19 are connected by means of suitable tubes or passages 25 with a funnel-like collector 26 so that pellets selected from any one of the tubes 17 will be dropped into the collector 26, from whence the pellets will pass through a single tube 27 which extends from the collector 26 to a point immediately above the plumb-bob 5.

The disc 21 may be rotated in any suitable manner but is preferably rotated at a constant speed by means of a suitable clockwork 29, which drives through suitable gearing 30 a shaft 31 which extends upwardly through the plate 19 to engage the plate 21 to which it is secured by means of a suitable attaching device or set screw 32. The clockwork 29 may continuously rotate the disc 21 or may be arranged to move the plate 21 intermittently through a predetermined portion of a complete rotation, as may be desired, the only requisite being that there must be a timed relation between the passage of the opening 23 in the plate 21 past the various tubes 17 so that the pellets selected will be dropped through the tube 27 at the expiration of predetermined timed intervals.

The housing 15 for the pellets 22 may be suitably secured as by screws 33 to a supporting base 34 which is attached to the supports 14, and a boss 35 may be formed on the plate 34 to act as a stiffening bearing for the shaft 31.

In operation the device thus far described causes one of the pellets 22 to be selected and dropped through the plumb-bob at successive timed intervals, these timed intervals being preferably such as to permit the movement of the entire instrument from one position in which it is to register the angle of inclination to a second position at a different depth in the bore so that the dropping of the pellets always occurs when the instrument is at rest at a desired level in the bore.

Referring particularly to Figure 3, it will be observed that the plumb-bob 5 comprises an enlarged head 36 which is bored as at 37 to provide a funnel-like entrance to the passageway 12 which extends downwardly through the shaft 38 of the plumb-bob structure. The lower end of the plumb-bob is formed with an enlarged portion 39 to provide the necessary weight upon the lower end of the plumb-bob to insure its ready movement to a true vertical position, the enlarged portion 39 being tapered to terminate in a relatively narrow end or point 7 which can be aligned with any of the bores 11 in the base 8.

The support 6 for the plumb-bob 5 may be made in any suitable manner, though we have illustrated the same as comprising an annular ring 40 having trunnion screws 41 extending radially therethrough at diametrically opposite sides of the ring. The trunnions 41 may terminate in sharpened points 42 which enter and fit conical shaped openings 43 in the enlarged portion 36 of the upper part of the plumb-bob. The form of bearing thus described may be substituted for by suitable jeweled bearings of the type well known in the construction of measuring instruments. The annular ring 40 may be supported upon the flange 3 of the frame 1 by means of suitable lugs 44 secured in any suitable manner to the flange 3 so as to act as supports for trunnion bearing members 45. The trunnion bearing members 45 engage conical shaped depressions in the annular ring 40, which are disposed at points substantially 90 degrees spaced from the trunnions 41.

If the instrument thus far described is secured to the lower end of a drill tool string and lowered into the bore of a well, it will be observed that by lowering the instrument to a given depth and allowing the same to remain at that depth until one of the pellets has been dropped, the angular deflection of the bore at that point will be registered by the particular one of the openings or bores 11 into which that pellet drops. The pellets are preferably each distinguished from the others by means of a suitable characterizing mark such as by inscribing a number or other suitable character upon the pellet.

For example, the pellets may comprise tiny steel balls, on the surface of which is inscribed either by engraving or etching a suitable number distinguishing that ball from all of the remainder. Thus the number of the ball which is found in any opening 11 in the base 8 when the base is withdrawn identifies the ball which was dropped at a certain time when the instrument was at a certain known depth.

By attaching the instrument to the end of the drill string so that it is rigid with respect thereto, the horizontal rotational movement of the instrument as by rotation of the drill string as it passes into the bore may be measured by sighting a predetermined point on the upper and lower ends of each section of the drill string at the time it is lowered into the bore. For example, the instrument may be placed upon the first length of drill string and a predetermined point on the instrument alined with a distant object. The upper end of the drill string may then also be sighted upon the distant object and this point noted on the upper end of the drill string. Then, upon lowering the drill string, the angular rotation from the sighting line may be noted as is indicated in Fig. 8, as by surrounding the base of the drill string with a board 46 and driving a nail 47 in the board at a position which corresponds to the direction in which the noted point on the drill string is facing.

A suitable sighting device 50 may be employed for the sighting operation which will permit the orientation of the top of each section of the drill string with a selected sighting point 49.

While any type of sighting device may be used, we prefer to utilize a device such as that illustrated in Figure 9, which comprises a clamp 51 formed of a plurality of hinged sections 52, 53 and 54. The sections 53 and 54 may be provided with outstruck lugs 55 to permit of the passage of a clamping bolt 56 therethrough to secure the clamp to the upper end of the drill section 48. Slidably attached to one of the sections 52 of the clamp, we have illustrated a sighting supporting socket member 57, this member being slidable around section 52 of the clamp as by means of a screw adjusting device 58 having a screw 59 thereon engaging a suitable threaded portion 60 of the clamp section 52. A spring 57a normally biases the sliding socket section 57 into close relation with the screw 59. Insertable into the socket sliding section 57 is a sighting support rod or bar 61 having rigidly mounted thereon a pair of upstanding sights 62 and 63. These sights may be of any suitable construction, though we prefer the same to comprise a block having an opening therethrough.

The block 62 which is illustrated as being nearest the clamp 51 is illustrated as being provided with its opening 64 in the form of a relatively narrow slot, while the sight 63 is illustrated as having a relatively large opening 65 therethrough in the center of which is mounted a vertically extending hair or wire 66, such as is ordinarily used to determine the "hair line" of sighting instruments. We prefer that the distance $x$ between the clamp 51 and the innermost sight 62 shall be such as to permit a person making a sight therefrom to place his eye behind the sight 62. Thus the sight line which is determined by the sighting device is that line which extends from the center of the drill string to the sighting object 49. By constructing the sighting device and the clamp in the manner described, it will be apparent that the sighting device may be readily attached to the drill string and detached therefrom, it being unnecessary that the device shall be accurately aligned before it is secured to the drill string since a rough adjustment is sufficient because of the construction of the supporting section 57 of the device, which is adjustable through a considerable arc. Thus the clamp may be placed upon the drill string in a rough approximation of its proper direction and may be aligned by suitable adjustment of the adjusting screw 59.

By recording the direction of the drill string before it is lowered into the well bore, and recording the horizontal angle through which it rotates when it is lowered into the bore, as by noting the direction of the sighting device 50, when the string has been lowered the exact degree of rotation of the surveying instrument may be recorded and thus the location of the pellet of a given number in one of the bores 11 in the base member 8 will correspond exactly to the angular deflection of the bore from the true vertical and also the direction of such angular deflection.

While we have illustrated and described the preferred embodiment of our invention, it is to be understood that the drawings and description herein referred to are for illustrative purposes only and we do not desire to be limited to any of the details shown herein except as defined in the appended claims.

We claim:

1. In an instrument for measuring the angular deflection of bores, a frame to be lowered into the bore, a base member on said frame having a plurality of openings therein, a plumb-bob mounted on said frame above said base, freely movable to assume a true vertical position under the influence of gravity, said plumb-bob having an opening therethrough, and means projectable through said plumb-bob into the openings in the base with which said plumb-bob is aligned at any given instant whereby the angular deflection of the frame from the vertical may be measured.

2. In an instrument for measuring the angular deflection of bores, a frame to be lowered into the bore, a base member on said frame having the upper face thereof perforated with openings therethrough, throughout substantially the entire area of the said upper face, a plumb-bob having an opening therethrough and mounted on said frame to assume a true vertical position under the influence of gravity, whereby the opening in the plumb-bob will assume a position of alignment with that one of the openings in the base corresponding to the direction and magnitude of the angular deflection of the bore from the vertical, and means projectable through the plumb-bob into the opening in the base for registering the deflection.

3. In an instrument for measuring the angular deflection of bores, a frame to be lowered into said bore to follow the line thereof, a plumb-bob on said frame mounted for movement thereto to always assume a true vertical position, an opening through the vertical axis of said plumb-bob, a base member on said frame immediately below said plumb-bob having substantially the entire face thereof adjacent the plumb-bob perforated, the perforations radiating in all directions from the center of the face, so that the direction and magnitude of the angular deflection of the bore from the vertical will cause the opening in the plumb-bob to align with a corresponding perforation in the base, and means projectable through the opening in the plumb-bob and the aligned opening in the base for registering the deflection.

4. In an instrument for measuring the angular deflection of bores, a frame to be lowered into said bore to follow the line thereof, a plumb-bob on said frame mounted for movement thereto to always assume a true vertical position, an opening through the vertical axis of said plumb-bob, a base member on said frame immediately below said plumb-bob having substantially the entire face thereof adjacent the plumb-bob perforated, the perforations radiating in all directions from the center of the face, so that the direction and magnitude of the angular deflection of the bore from the vertical will cause the opening in the plumb-bob to align with a corresponding perforation in the base, means projectable through the opening in the plumb-bob and the aligned opening in the base for registering the deflection, and time controlled means for intermittently projecting said projectable means through said plumb-bob at predetermined time intervals.

5. In an instrument for measuring the angular deflection of bores, a frame to be lowered into said bore to follow the line thereof, a plumb-bob on said frame mounted for movement thereto to always assume a true vertical position, an opening through the vertical axis of said plumb-bob, a base member on said frame immediately below said plumb-bob having substantially the entire face thereof adjacent the plumb-bob perforated, the perforations radiating in all directions from the center of the face, so that the direction and magnitude of the angular deflection of the bore from the vertical will cause the opening in the plumb-bob to align with a corresponding perforation in the base, a plurality of pellets each having a distinguishing characteristic, and means for successively projecting said pellets through said plumb-bob to said base at predetermined time intervals.

6. In an instrument for measuring the angular deflection of bores, a frame to be lowered into said bore to follow the line thereof, a plumb-bob on said frame mounted for movement thereto to always assume a true vertical position, an opening through the vertical axis of said plumb-bob, a base member on said frame immediately below said plumb-bob having substantially the entire face thereof adjacent the plumb-bob perforated, the perforations radiating in all directions from the center of the face, so that the direction and magnitude of the angular deflection of the bore from the vertical will cause the opening in the plumb-bob to align with a corresponding perforation in the base, a plurality of pellets of a size to pass through said plumb-bob each having a distinguishing characteristic, means for storing said pellets on said frame, and means for feeding said pellets from said storing means to said plumb-bob, one at a time.

7. In an instrument for measuring the angular deflection of bores, a frame to be lowered into said bore to follow the line thereof, a plumb-bob on said frame mounted for movement thereto to always assume a true vertical position an opening through the vertical axis of said plumb-bob having substantially the entire face thereof adjacent the plumb-bob perforated, the perforations radiating in all directions from the center of the face, so that the direction and magnitude of the angular deflection of the bore from the vertical will cause the opening in the plumb-bob to align with a corresponding perforation in the base, a plurality of pellets of a size to pass through said plumb-bob each having a distinguishing characteristic, means for storing said pellets on said frame, and timed means for feeding said pellets one at a time from said storing means to said plumb-bob at predetermined time intervals.

8. In an instrument for measuring the angular deflection of bores, a frame to be lowered into said bore to follow the line thereof, a plumb-bob on said frame mounted for movement thereto to always assume a true vertical position, an opening through the vertical axis of said plumb-bob, a base member on said frame immediately below said plumb-bob having substantially the entire face thereof adjacent the plumb-bob perforated, the perforations radiating in all directions from the center of the face, so that the direction and magnitude of the angular deflection of the bore from the vertical will cause the opening in the plumb-bob to align with a corresponding perforation in the base, a plurality of pellets of a size to pass through said plumb-bob each having a distinguishing characteristic, means for storing said pellets on said frame, a disc immediately under the storing means, having an opening therethrough for a single pellet only, a passage connecting said disc with the opening in the plumb-bob, and means for moving said disc to align the passage with the storing means to select one pellet and then aligning the passage with the connecting means whereby one pellet at a time is fed from the storing means to said plumb-bob.

9. An instrument for registering the true vertical direction including a plumb-bob and a passageway therethrough extending along the vertical axis thereof, a base member having a concave upper face to correspond to the spherical path described by the plumb-bob in its movements, a plurality of perforations in said face arranged in all directions from the center thereof, the plumb-bob aligning its opening with that perforation corresponding to the direction and magnitude of the deflection of said base from the true vertical.

Signed at Los Angeles, California, this 7th day of July, 1930.

WAYNE M. SMITH.
KENNETH W. HALEY.